Dec. 9, 1958   J. T. FALLON   2,863,644
REGENERATIVE HEAT EXCHANGE APPARATUS
Filed Dec. 4, 1956   4 Sheets-Sheet 1

Inventor
John Thomas Fallon
by James G. Bechell
Attorney

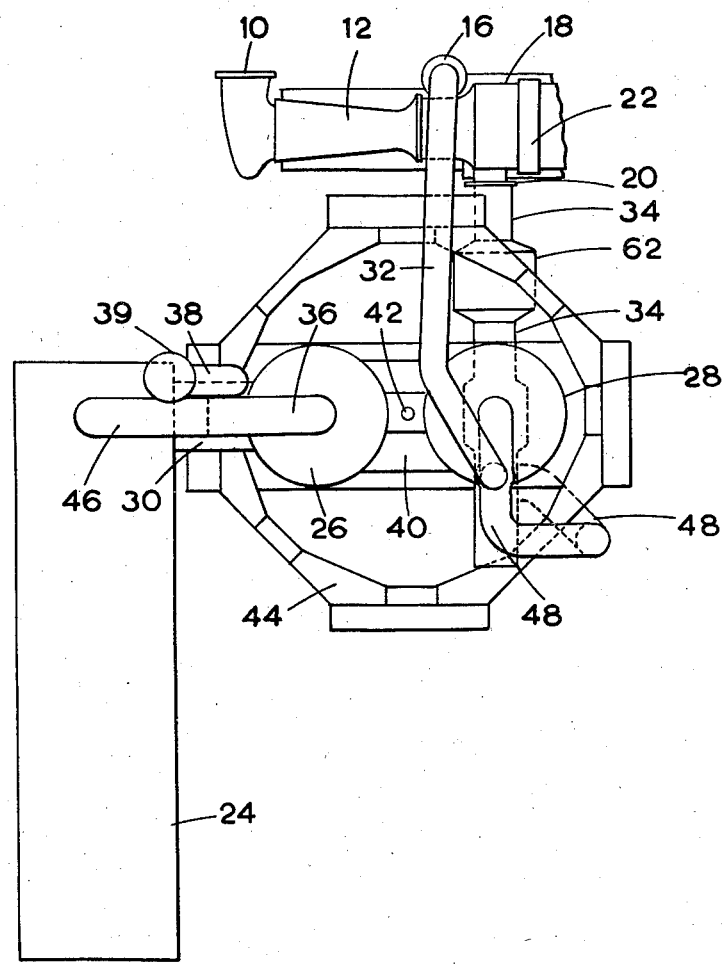

Dec. 9, 1958 J. T. FALLON 2,863,644
REGENERATIVE HEAT EXCHANGE APPARATUS
Filed Dec. 4, 1956 4 Sheets-Sheet 3
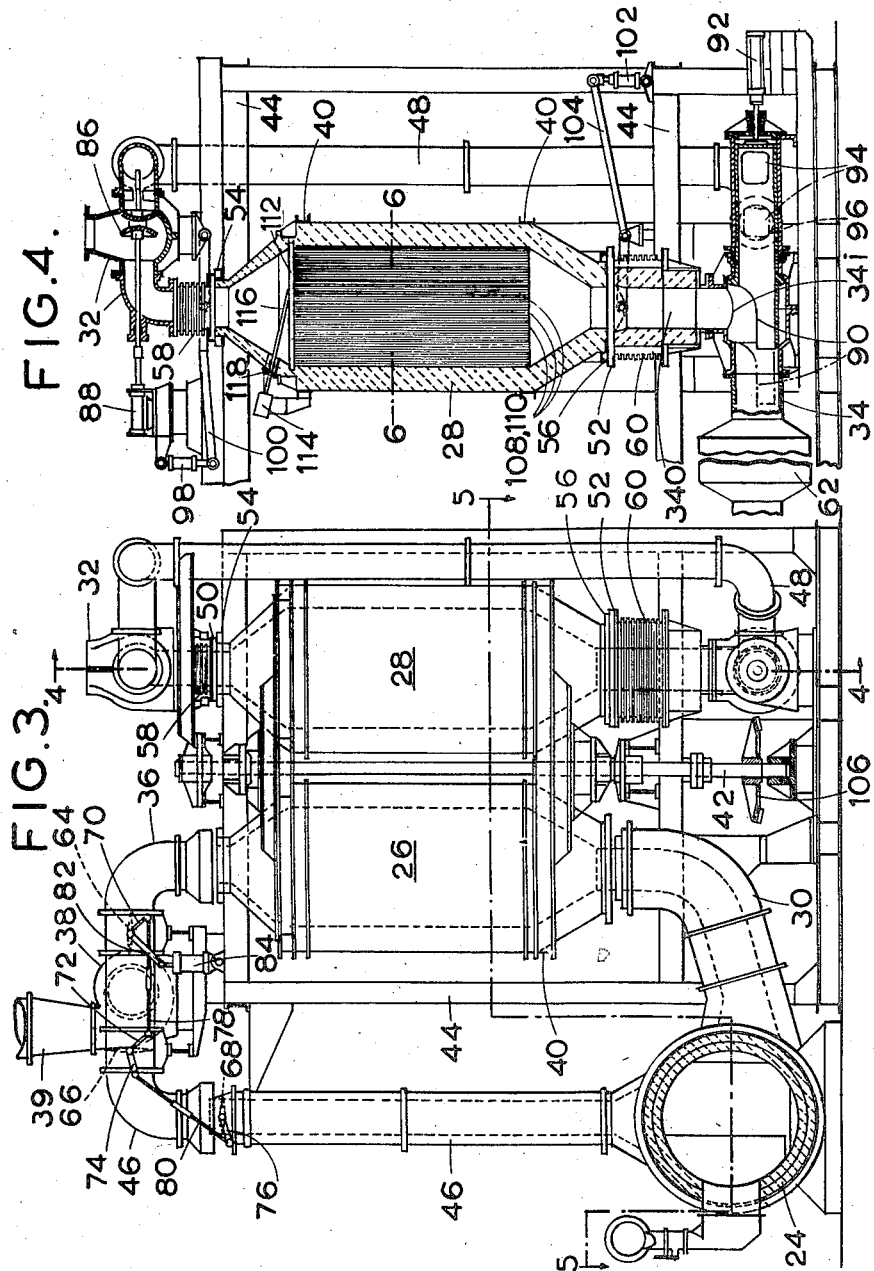
Inventor
John Thomas Fallon
by James G. Bennell
Attorney Dec. 9, 1958  J. T. FALLON  2,863,644
REGENERATIVE HEAT EXCHANGE APPARATUS
Filed Dec. 4, 1956  4 Sheets-Sheet 4
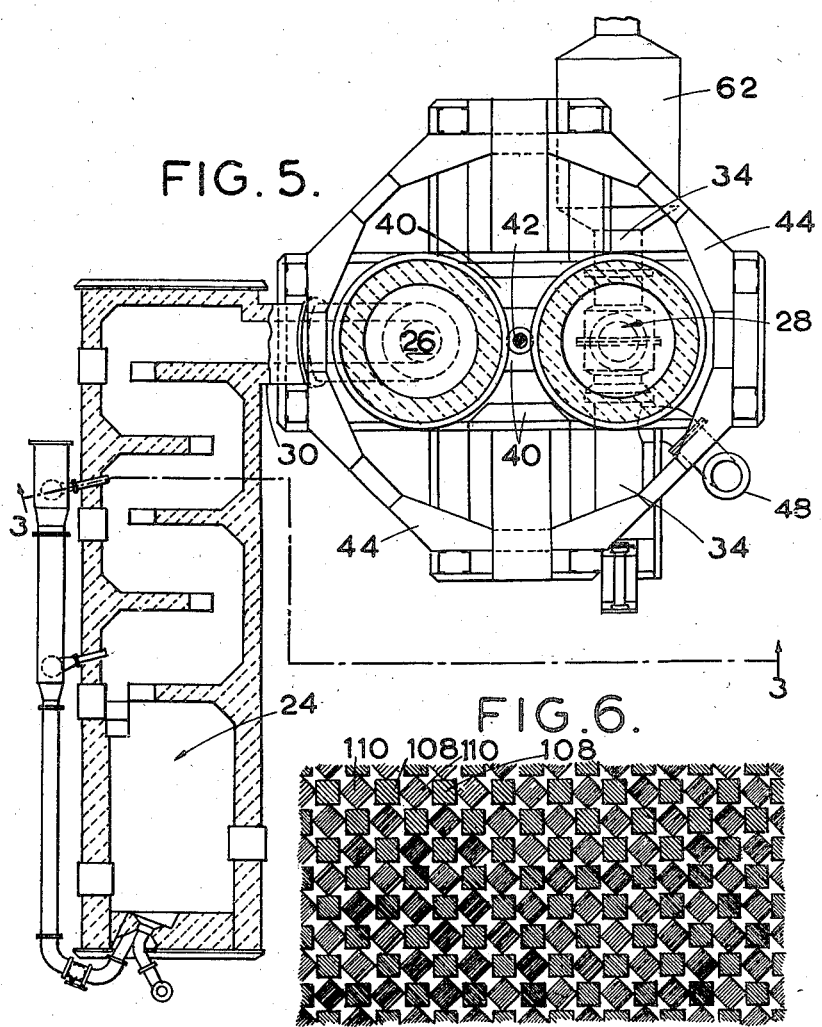
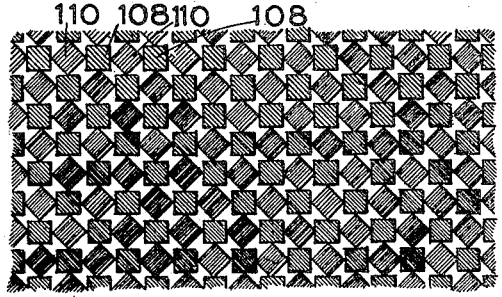
Inventor
John Thomas Fallon
by James G. Bennell
Attorney

2,863,644
REGENERATIVE HEAT EXCHANGE APPARATUS

John Thomas Fallon, Olton, Birmingham, England

Application December 4, 1956, Serial No. 626,109

Claims priority, application Great Britain
December 5, 1955

6 Claims. (Cl. 257—6)

This invention relates to improvements in regenerative heat exchange apparatus, e. g. for preheating combustion air for a furnace, operating on the usual reversing cycle in which the chequer work or matrix of a regenerative heat exchanged is alternately scrubbed in opposite directions by a hot gas from which it receives heat, and by the air or gas to be heated to which it rejects heat.

In addition, the invention relates to gas turbine engines, especially such as derive their heat-input from hot gaseous combustion products of a contaminant nature in respect of dust content and/or constituents chemically reactive with hot metals.

In what follows, for convenience only, the fluid which rejects heat will be referred to as "gas" and the fluid which receives heat will be referred to as "air."

A regenerative heat-exchange apparatus according to the present invention is adapted for continuous flow, i. e. without interruption of the flows of gas and air, and comprises two similar regenerative heat-exchangers (hereinafter referred to as regenerators) which are alternately brought into circuit with the air supply and discharge line and with the gas supply and exhausting line by mounting them on a rotatable structure symmetrically with respect to the axis of rotation and disposing the air and gas lines in such a way that in two possible positions of said structure, separated by 180° of rotation, corresponding openings at one end (e. g. the top, the axis of rotation being assumed vertical) of the regenerators register respectively with open ends of an air supply pipe and of a gas exhaust pipe and corresponding openings at the other end (e. g. the bottom) of the regenerators register respectively with open ends of an air discharge pipe and of a gas supply pipe, and by intermittently rotating said structure through 180° from one of such positions to the other, the rotation taking place either always in the same sense (rotary motion) or alternately in opposite senses (oscillatory action).

It will be evident that during the change-over from one to the other of the alternative positions the air and gas lines will be interrupted, and in order to enable the air and gas flows to be continuous a regenerative heat-exchange apparatus according to the invention may be further characterised by the provision of by-pass paths for air and gas controlled by valves, which are automatically thrown-over from their normal positions to their by-passing positions during the rotation of the regenerator assembly.

The mutually registering openings of the air and gas pipes and of the regenerators are preferably provided with mating flanges, between which there must be a working clearance to enable the regenerator assembly to rotate freely. Now it will normally be necessary to deliver the heated air at or above atmospheric pressure and therefore to overcome the pressure drop through the heat-rejecting regenerator the air must be supplied under pressure.

To avoid loss of air through the clearances between the flanges of the air pipes and heat-rejecting regenerator, means for sealing these clearances are preferably provided together with means for automatically re-establishing the clearances when rotation takes place. For instance, the flanges may be provided with clamps for bringing them into sealing contact, such clamps being automatically releasable by mechanical or electrical means when rotation commences, the clearance being thereupon re-established either by the deflection of the pipes themselves, made possible by providing suitable elbows, in which case the elasticity of the pipes may furnish the deflecting force, or by mounting the flanges on suitable bellows, glands or the like, which may be spring-loaded or mechanically operated.

Similar means may be provided for sealing the flange clearances of the heat-receiving regenerator to avoid outward leakage of possibly noxious gases and overheating of the flanges by outward leakage of hot gas, but preferably this end is achieved by keeping the gas line under sub-atmospheric pressure throughout by means of an exhaust blower applying suction to the exhaust pipe and maintaining permanent clearances between the flanges of the gas supply and exhaust pipes and of the heat-receiving regenerator, since inward leakage of atmospheric air at these points is not harmful, provided such air leakage at the hot end of the regenerator is not so great as materially to reduce the temperature of the gas entering the regenerator, and slight air leakage at this point is beneficial in keeping the flanges cool.

With air supply under pressure and with exhaust under suction, a preferred arrangement of the air and gas by-passing system is as follows:

(1) A by-pass pipe from the air supply pipe to the air discharge pipe is controlled at both ends by a valve or valves, which are ganged together so that in one position the by-pass pipe is shut-off at both ends and in the other is in circuit, the air supply pipe leading to the regenerator and the connection of the latter to the air discharge pipe being then both shut-off.

(2) A by-pass pipe from the gas supply to the exhaust pipe at a point on the suction side of the exhaust blower is controlled by a valve or valves which connect the exhaust blower either to the heat-receiving regenerator or to the gas by-pass pipe; the exhaust being under suction, a valve at the other end of the exhaust by-pass pipe is unnecessary, since when the open end of the gas supply pipe is disconnected from the regenerator the connection of the gas by-pass pipe to the exhaust blower will apply suction to the said open end and will prevent gas escaping from it, but rather will suck air in through it; and this air will help to cool the gas by-pass pipe. To prevent escape of hot and possibly noxious gas from the open end of the gas supply pipe during the actual movement of the valve(s), both before and after the gas by-pass is fully open, that is during the short intervals before and after the application of full suction to the open-pipe-end, the flanges of the regenerator openings, which in turn register with the open end of the gas supply pipe, may be extended widely enough to keep such open end covered at least so long as the gas by-pass it not fully open. These flanges of the two regenerators may indeed be so extended as to coalesce and become a single annular or semi-annular disc flange which keeps the open end of the gas supply covered at all times when not in register with the corresponding opening of a regenerator.

The several valves will be operatively interconnected with the means for rotating the regenerator assembly, so that both by-passes are put into circuit only when rotation is taking place.

The valves at the junctions of the air supply pipe with the air by-pass pipe and of the gas by-pass pipe with the exhaust pipe, being located in low temperature zones, may be simple mushroom-type or butterfly or flap valves, while the valve at the junction of the air by-pass pipe with the air discharge pipe, being located in a high temperature zone is preferably of the piston type and may be constituted by a simple sliding sleeve having a single port.

When the air supply is by-passed direct to the air discharge pipe, the air discharged would be cold if not specially heated. In a preferred arrangement therefore, a thermal storage chamber, packed with chequer work or a matrix of heat-receiving, -storing and -rejecting elements, is interposed between the junction of the air by-pass pipe with the air discharge pipe and the final air discharge point. This thermal storage chamber rejects heat, received and stored during the discharge of hot air from the heat-rejecting regenerator, to the by-passed air during the change-over phase while the regenerator assembly is rotating, the duration of this phase being short compared with the period of the complete cycle.

Any convenient means may be used for intermittently rotating the regenerator assembly, e. g. a geared electromotor controlled by a time switch device (the motor being reversible if oscillatory motion is adopted); and the several valves may be mechanically operated by the motor through suitable cams or may be electromagnetically operated, the exciting circuits of the electromagnets and the motor circuit(s) being controlled, through such relays as may be appropriate, by a master time switch device.

This invention further includes the combination with a regenerative heat-exchange apparatus as hereinbefore described of a gas turbine engine, the air constituting its working fluid, after being compressed by a compressor and before being expanded through a turbine or turbines, being heated by being passed through the heat-rejecting heat exchanger of the regenerative heat exchange apparatus whose heat-receiving heat exchanger is in circuit with a hot gas generator and its exhaust system, which will usually though not necessarily include an extraction fan or blower.

The principle of supplying the necessary heat input for the air constituting the working fluid of the engine by non-mixing heat exchange, instead of by burning a fuel in it so that it becomes mixed with combustion products, substantially avoids the contamination of the working fluid, before it enters the turbine(s), with constituents detrimental to turbine blading such as abrasive dust and substances strongly chemically reactive with hot metals, such constituents being present in large amounts in the combustion products of certain fuels which otherwise have advantages in point of cheapness and availability in certain situations.

Further, it is my belief that the regenerative heat exchange apparatus as above described offers considerable advantages over a tubular or the like continuous flow, recuperative heat exchanger especially in respect of first cost, durability and low pressure drop across the heat exchanger, the last being a consideration of great importance for the efficiency of the engine which is extremely sensitive to changes of pressure drop between compressor and turbine. In a tubular recuperative heat exchanger in which the heat is directly transferred from the hot gas to the air across the walls of the tubes, the latter, which in the application to a gas turbine engine must withstand a pressure difference of several atmospheres, must in practice be made of nickel-chrome alloy to have the necessary strength. Not only does this make the heat exchanger very costly, but the nickel content of the tubes renders them susceptible to rapid deterioration through oxidation and chemical attack by certain constituents which may be present in fairly large amount in the hot gas. The elements of a matrix of a regenerative heat exchanger, which for the temperatures attained in gas turbine engines may be of metal, are not stressed by being subject to pressure-difference and therefore need only have moderate strength, especially if so disposed that the elements or parts thereof exposed to the higher temperatures are lightly stressed mechanically; this enables materials to be used, which though of inferior hot strength have superior resistance to chemical attack, especially by substances like sodium chloride, which may be present in considerable amount in the hot gas or in the ash particles suspended therein. For this purpose a matrix composed of suspended rods extending from top to bottom of a heat exchanger with vertical flow, the hotter end being at the bottom, as hereinafter more fully described, is especially advantageous, since the maximum temperature coincides with the minimum mechanical stress (at the lower ends of the rods) and conversely.

The pressure drop across a regenerative heat exchanger having such a matrix is very much less than, being of the general order within fairly wide limits of one tenth of, the corresponding pressure drop across a conventional tubular, recuperative heat exchanger. A regenerative heat exchanger apparatus having such matrices can almost certainly be constructed much more cheaply than a conventional tubular, recuperative, heat-exchanger with nickel-chrome tubes.

The accompanying drawings illustrate an embodiment of the invention by way of example only and without implied limitation of the scope of the invention which is defined in the hereto appended claims.

In the drawings,

Figure 2 is a plan of the same;

Figure 3 is a sectional elevation on the line 3—3 of Figure 5 of a regenerative heat exchanger with twin oscillating or rotating regenerators, suitable for incorporation in the combination of Figures 1 and 2;

Figure 4 is a sectional elevation on the line 4—4 of Figure 3;

Figure 5 is a sectional plan on the line 5—5 of Figure 3; and

Figure 6 is a fragmentary sectional plan on the line 6—6 of Figure 4.

Figure 1:
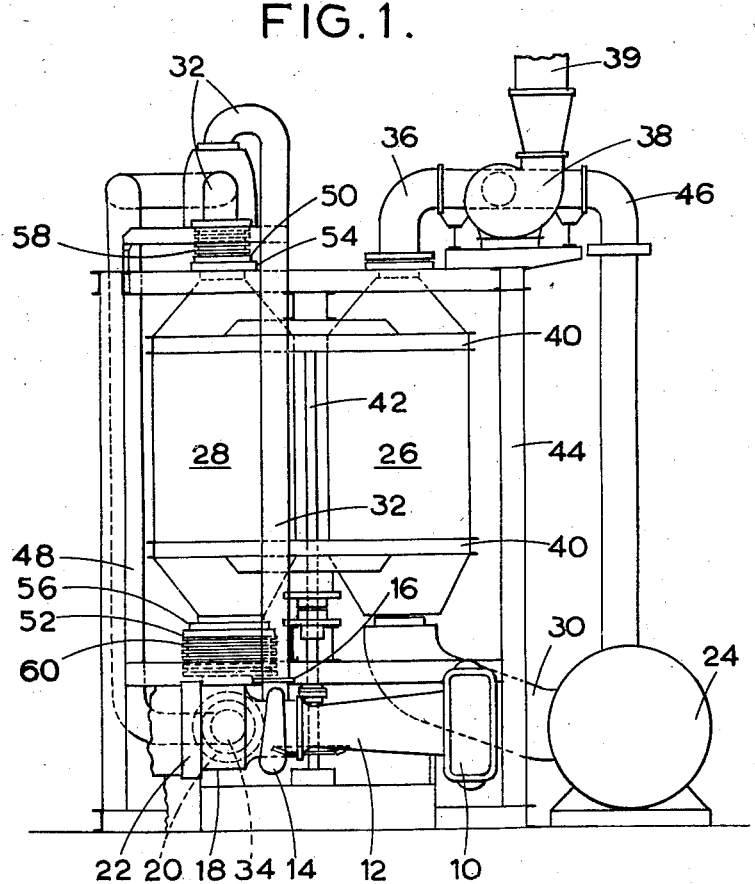
Figure 1 is an elevation of an industrial gas turbine engine with a combustion chamber burning solid pulverised fuel and a regenerative heat exchanger for transferring heat from the combustion products to the working fluid consisting of air.

The gas turbine engine illustrated in Figures 1 and 2 comprises a sectionalised casing, of which the first section 10 is the air inlet collector, the next section 12 houses the compressor, the next section includes a compressor outlet volute 14 terminating in a coupling flange 16, the next section 18 houses the turbine inlet volute having an external coupling flange 20 and the final section 22 houses the turbine or turbines.

Air aspirated through the inlet 10, compressed in the compressor 12 and discharged by the outlet volute 14 is indirectly heated through the agency of a regenerative heat-exchange apparatus deriving its heat-input from the combustion products of a combustion chamber 24 fired with low-grade, pulverised, solid fuel, such as finely ground peat.

The regenerative heat-exchange apparatus (whose main components are shown in Figures 1 and 2 and which is illustrated in detail in Figures 3 to 6) comprises a pair of regenerative heat-exchangers, hereinafter referred to as regenerators 26, 28, which alternately receive heat from hot gases (in this instance the combustion products discharged by the combustion chamber 24) which enter the regenerator through a gas supply pipe 30, and reject heat to air received from an air supply pipe 32 (which in this instance is connected to the coupling flange 16 of the compressor outlet volute 14), the air so heated being delivered through an air discharge pipe 34 which in this instance is connected to the coupling flange 20 of the turbine inlet volute. The gases after passing through the heat receiving regenerator 26 are extracted through a pipe 36 by means of an exhaust blower 38 and discharged to atmosphere through a stack 39.

The regenerators 26, 28 are arranged with their axes vertical; the combustion products enter at the bottom and leave at the top and the air to be heated enters at the top and leaves at the bottom, so that the hotter end of the regenerators is the bottom. The regenerators are mounted in frames 40 supported by a vertical shaft 42 on either side of which the regenerators are symmetrically disposed. The shaft 42 is journalled in bearings in a stationary gantry structure 44, which also supports the open ends of pipes 30, 36, 32 and 34; and means (not illustrated) are provided for intermittently turning the shaft 42 through 180°, either always in the same sense (intermittent rotation) or alternately in opposite senses (oscillatory motion) to connect each regenerator alternately with the pipes 30, 36 and with the pipes 32, 34 respectively, so that while one regenerator is rejecting heat the other is receiving it.

To maintain continuity of flow and avoid escape of combustion products and compressed air during the transition periods when the regenerator assembly 26, 28, 40, 42 is being rotated through 180°, by-pass pipes 46, connecting pipes 30 and 36 and 48, connecting pipes 32 and 34, are provided, these by-passes being controlled by valves operated synchronously with intermittent rotation of the shaft 42 (vide infra), so that when the regenerators are stationary they are in circuit with pipes 30, 36, 32 and 34 and the by-pass pipes 46 and 48 are isolated and during the rotation periods the open ends of pipes 32, 34 and 36 are closed and the by-pass pipes 46, 48 are in circuit. Closure of the open end of pipe 30 is unnecessary, since the exhaust blower 38 by applying suction to the by-pass pipe 46 keeps the open end of pipe 30 under sub-atmospheric pressure, inward leakage of air at this point during the rotation periods being harmless, such leakage escaping to atmosphere again via the by-pass pipe 46.

To enable the regenerator assembly to rotate, clearances must be provided between the open ends of pipes 30, 36, 32, 34 and the regenerators. The clearances at the ends of pipes 30 and 36 if kept reasonably small need not be sealed since, owing to the suction applied by the exhaust blower 38, leakage at these points is inwards and the temperature at which the hot combustion products are discharged from the combustion chamber can be controlled to compensate for slight dilution by cold air entering at the clearance between pipe 30 and the heat receiving regenerator. Since, however, the air supplied to the heat rejecting regenerator may be at upper super atmospheric pressure (and in the present instance more especially in which the air is supplied by the engine compressor at a pressure of several atmospheres and the efficiency of the engine is very sensitive to loss of pressure between compressor and turbine) it is important to seal the joints between pipes 32, 34 and the heating rejecting regenerators as completely as possible. To this end the ends of pipes 32 and 34 have movable sealing rings 50, 52 which cooperate with sealing rings 54, 56 fixed on the regenerators at their top and bottom openings and are connected gas-tightly with pipes 32, 34 respectively by flexible bellows 58, 60. Means (not illustrated) are provided for moving the sealing rings 50, 52 axially of the regenerators, in synchronism with the intermittent rotation of the regenerator assembly, to separate the rings 50, 52 from the fixed sealing rings 54, 56 during the periods of rotation and to hold the sealing rings 50, 52 in gastight contact with sealing rings 54, 56 respectively when the regenerator assembly is stationary.

During the periods of rotation the compressed air supply being by-passed through the by-pass pipe 48, receives no heat from the regenerators 26, 28. To maintain the heat input to the air supply during these periods, a thermal storage chamber 62 containing an appropriate matrix of heat retentive elements, preferably metallic, is disposed in the run of pipe 34 between its junction with the by-pass pipe 48 and the turbine volute coupling flange 20. During the relatively short periods when pipe 34 receives unheated air from the by-pass pipe 48, this air is heated by the matrix of chamber 62, and the heat rejected by this matrix during such periods is restored during the relatively long periods when pipe 34 carries air heated by the heat rejecting regenerator. The heat capacity of the thermal storage chamber 62 is made large enough to ensure that the temperature drop of its matrix over the period during which it is rejecting heat is not large enough to have any appreciable detrimental effect.

Further details of a preferred form of construction of the regenerative heat exchange apparatus are illustrated in Figures 3 to 6 of the accompanying drawings. The pipes 36 and 46 are connected by a short T-piece to the centre member of which the exhaust blower 38 is connected. At either end of the T-piece are butterfly valves 64, 66 respectively controlling the regenerator hot gas feed pipe 36 and the by-pass pipe 46. In the pipe 46 is a further butterfly valve 68. Valves 64, 66, 68 are interconnected by levers 70, 72, 74, 76 and links 78, 80 so that when valve 64 is open valves 66, 68 are closed (as shown in Figure 3) and conversely. The reason for duplicating the valves in the by-pass pipe 46 is the presence of an unsealed expansion joint where the upright part of pipe 46 meets the elbow connecting it to the exhaust blower. Valves 64, 66, 68 are actuated through a lever 82 by a common hydraulic jack 84.

In the pipe 32 at its junction with the by-pass pipe 48 is a double mushroom valve 86 having two alternative seating positions in one of which it closes the top end of pipe 48 leaving pipe 32 unobstructed and in the other blocks the elbow of pipe 32 leading to the regenerator 28 (or 26) and unseals the port leading from pipe 32 to pipe 48. Valve 86 is actuated through a stem passing through a sealing gland by an hydraulic jack 88.

The open end of pipe 34 which communicates with the regenerator 28 (or 26) is constituted by a lagged branch 340 extending at right angles from a port 341 in pipe 34 which extends beyond port 341. In this extension, which is blind but has a port 96 communicating with pipe 48, slides a valve sleeve 90 having a port 94 and actuated, through a rod passing through a sealing gland, by an hydraulic jack 92. In the position shown in full lines sleeve 90 blocks the lower end of pipe 48 by closing port 96 and establishes communication between branch 340 and pipe 34 by leaving port 341 unobstructed. In the position shown in chain-dotted lines sleeve 90 obstructs port 341 and establishes communication between pipe 34 and the by-pass pipe 48 by bringing port 94 into register with port 96.

The movable sealing ring 50 is actuated by an hydraulic jack 98 through a lever 100; and the movable sealing ring 52 is actuated, through a lever 104, by a similar jack 102. The shaft 42 has a crown wheel 106 which meshes with a pinion (not illustrated) driven by any suitable motor. This motor and the means preferably electrical, by which the periods of activity thereof and of the jacks 84, 88, 92, 98, 102 are synchronised are not illustrated.

The regenerators 26, 28 have metallic matrices composed of a large number of suspended, vertical rods 108, 110. In the example illustrated the rods 108, 110 are of square cross-section, are suspended from a grid of transverse bars 112, and extend the full depth of the matrix, being closely packed as shown more clearly in Figure 6. The rods 108, which are straight, alternate with rods 110 which are twisted in the same way as concerete-reinforcing rods often are, the degree of twist in the example illustrated being one complete turn in the length of the rod. The twisting of alternate rods is believed to be advantageous but is not essential.

Such a matrix promotes laminar flow of the air or gas passing through it, thus minimising the pressure drop across the regenerator of the air constituting the working fluid of the engine between the compressor and the turbine(s).

To minimise the likelihood that deleterious dust particles may be deposited from the combustion products passing through a heat-receiving regenerator on the rods 108, 110 of its matrix and picked up by the air passing through it when it has become a heat-rejecting regenerator, means may be provided for vibrating the matrix of each regenerator, e. g. a vibrator 114 of any suitable known type, preferably ultrasonic, connected to the grid 112 by a rigid bar 116 extending through a gas-tight gland 118.

I claim:

1. Regenerative heat exchange apparatus for transferring heat from a continuously flowing stream of hot gas to a continuously flowing stream of initially colder gaseous fluid, said apparatus comprising a rotatable structure; means for intermittently rotating said structure through half a revolution between a first and a second rest position; two identically similar regenerative heat exchangers, each comprising a casing containing heat-retentive elements and having an opening at each end, said exchangers being so symmetrically mounted on said structure as to interchange their positions exactly at each half revolution of said rotatable structure; a first fixed pipe for conveying said gaseous fluid to one heat exchanger, a second fixed pipe for conveying therefrom the fluid heated thereby, a third fixed pipe for conveying hot gas to the other heat exchanger, and a fourth fixed pipe for conveying spent gas therefrom, said pipes terminating in open ends which, when said structure is in a rest position, register respectively with each of the openings of said heat exchangers, so that hot gas and fluid to be heated flow through one and the other of said heat exchangers in counter-current; a first by-pass interconnecting said first and second pipes; a second by-pass interconnecting said third and fourth pipes; valve means operative to connect and disconnect said first by-pass and to close the open ends of said first and second pipes when said first by-pass is so connected; other valve means operative to connect and disconnect said fourth pipe to and from said second by-pass and to close the open end of said fourth pipe when said second by-pass is so connected; and means for so synchronizing the operation of all said valve means with the intermittent rotation of said structure that said by-passes are in circuit only when said structure is moving from one rest position to the other.

2. Apparatus as defined in claim 1, including sealing means operative when said structure is in a rest position with the open ends of said first and second pipes in register with the respective openings of a heat exchanger, for sealing the clearance between said openings and the open ends of said first and second pipes.

3. Apparatus as defined in claim 2, said sealing means comprising flexible bellows connected to the open ends of said first and second pipes respectively, and terminal flanges mounted on said bellows; sealing rings carried by said heat exchangers and surrounding the openings thereof and adapted to cooperate with said flanges to form effective seals; and means for displacing said flanges into sealing contact with said sealing rings when said structure is in either of its rest positions.

4. Apparatus as defined in claim 1, in which said first-mentioned valve means comprises a two-position mushroom-type valve which in one position seals said first by-pass from said first pipe and unseals the open end of said first pipe and in its other position allows said first pipe to communicate with said first by-pass and seals the open end of said first pipe; a two-position sleeve-type valve which in one position unseals the open end of said second pipe and seals it from said first by-pass and in its other position allows said first by-pass to communicate with said second pipe and seals the open end of the latter; and said other valve means comprises interconnected butterfly-type valves which in one position unseal the open end of said fourth pipe and seal it from said second by-pass and in another position seal the open end of said fourth pipe and allow the latter to communicate with said second by-pass; the apparatus further comprising means for applying suction to said fourth pipe and thereby, through said second by-pass, to said third pipe and to the open end thereof, so as to prevent escape of gas from said last-named open end when said structure is not in a rest position.

5. Apparatus as defined in claim 1 characterized in that the run of said second fixed pipe is provided with an enlarged chamber containing a matrix of heat-retentive elements of smaller thermal storage capacity than the regenerative heat exchangers.

6. Apparatus as defined in claim 1 characterized in that means are provided for vibrating the heat-retentive elements of said heat exchangers, preferably at ultrasonic frequency.

References Cited in the file of this patent
UNITED STATES PATENTS

| | | |
|---|---|---|
| 2,480,248 | Karlsson et al. | Aug. 30, 1949 |
| 2,692,761 | Waitkus | Oct. 26, 1954 |
| 2,746,725 | Reed | May 22, 1956 |

FOREIGN PATENTS

| | | |
|---|---|---|
| 1,075,242 | France | Dec. 14, 1954 |